(No Model.)

H. A. EATON.
STEAM COOKER.

No. 310,657. Patented Jan. 13, 1885.

Witnesses,
Fred J. F. Schwartz
Geo. W. Pierce

Inventor,
Hiram A. Eaton

UNITED STATES PATENT OFFICE.

HIRAM A. EATON, OF MANCHESTER, MAINE.

STEAM-COOKER.

SPECIFICATION forming part of Letters Patent No. 310,657, dated January 13, 1885.

Application filed June 14, 1884. (No model.)

*To all whom it may concern:*

Be it known that I, HIRAM A. EATON, of Manchester, in the county of Kennebec and State of Maine, have invented certain Improvements in Steam-Cookers, of which the following is a specification.

This invention relates to steam-cookers for culinary purposes of that class where a vessel containing water at its base has one or more partitions or pans for the reception of articles to be steamed or cooked superimposed by means of proper brackets or otherwise above the water, suitable apertures being provided, so that the steam generated by the water may arise and permeate the whole apparatus. In such steam-cookers it is usual to employ a gage, to indicate to the person in charge the amount of water in the receptacle in which the steam is generated, and when the water has been evaporated in part a supply is added.

My invention has for its specific object to provide an auxiliary reservoir or water-receptacle and improved means whereby, when the water is low in the boiler or water-receptacle of the cooker as the result of evaporation, a supply will be automatically added thereto from said auxiliary receptacle, thus doing away with the necessity of constant supervision of the person in charge, as the automatic introduction of a water-supply will be as constant as the necessity therefor or the evaporation of water in the cooker.

My invention also contemplates and provides an indicator-gage, as before, the action of which in the method set forth in this specification is caused to so act upon a valve in the auxiliary reservoir as to cause the same to open or close and permit a supply of water to flow from the auxiliary reservoir to the bottom of the cooker or prevent such flow, as the case may be.

My invention also contemplates that the supply-water thus introduced into the cooker shall be heated by contact with the external surface of the apparatus, so that the process of evaporation in the steam-cooker shall not be materially retarded by the introduction of the supply-water.

To these ends my invention consists in the several improvements which I will now proceed to describe, and point out in the appended claims.

Figure 1:
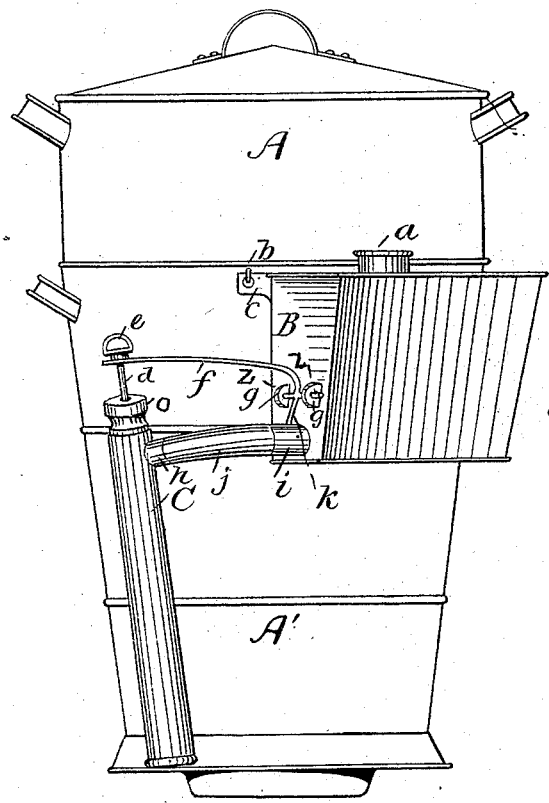
Figure 2:
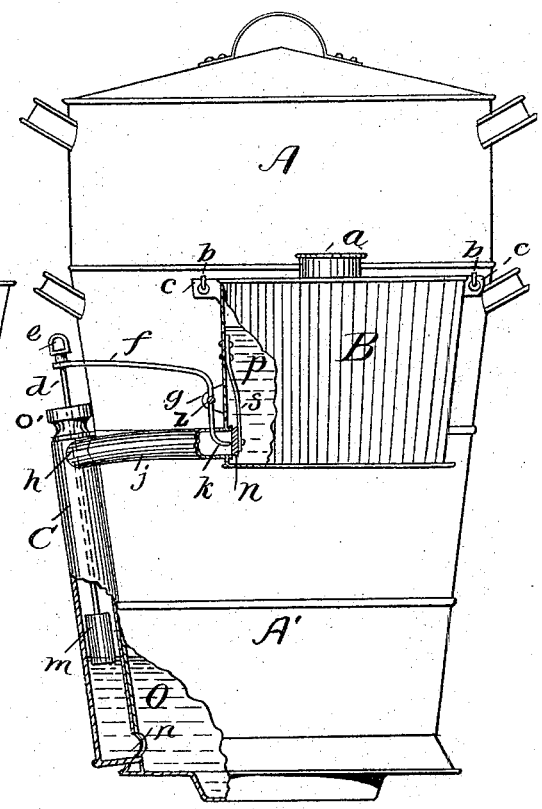

Of the accompanying drawings, forming a part of this specification, Figures 1 and 2 represent elevations of a steam-cooker embodying my invention, taken from different sides, Fig. 2 showing portions of the inclosing-walls broken away, to more clearly show the internal parts.

In the drawings, the steam-cooker is shown as composed of a base, A', and one or more superposed food-receptacles, A, which may be of the usual or any suitable construction and arrangement, and need not be described in detail.

The water used for the purposes of evaporation and consequent steam-cooking purposes is as usual in the base A' of the cooker, which constitutes a water receptacle or reservoir.

C is a tube secured to the outside of the reservoir A', and communicating with the lower part thereof by means of the orifice $n$, so that the water will stand at the same height in C that it does in A'. The top of the tube C is closed by a removable plug, $o$, having a hole through its center. A rod, $d$, passes through the hole in the plug $o$, and has upon its lower end a float, $m$, and upon its upper end an eye or shoulder, $e$.

I suspend or attach to the side of the cooker, by means of hooks $b\ b$, or otherwise, an auxiliary reservoir, B, capable of holding a sufficient supply of water.

At the end and lower part of the reservoir B is an outlet-tube, $i$, which is connected to the tube C preferably by means of a flexible tube, $j$, which is made to slip into or over the outlet-tube $i$ at one end, and into or over a branch from the tube C at its other end in such manner as to make water-tight joints, and at the same time to be readily detached.

To the inner side of the end of the reservoir B is a strap-spring, $s$, one end of which is fastened to the wall of the reservoir. Upon the other end of the spring is a button or valve, $n$, which presses upon the same.

Attached to the outside of the reservoir B are two lugs, $g\ g$, which support and form pivots for the arms $z\ z$ of a lever, $f$, one arm of which rests under the shoulders $e$ of the tuberod $d$, the other arm being curved and bearing upon the button or valve $n$.

The operation of the apparatus is as follows: A suitable supply of water, $o$, having been put into the main reservoir $A'$, and also into the auxiliary reservoir B, by means of the orifice $a$ in its top, the articles to be steamed are placed into the receptacle A, as usual.

Upon the application of heat steam is formed and fills the entire cooker. (Suitable means should be provided for conveying away the surplus steam, as usual.) When the water $o$ in the cooker is evaporated, the float $m$ falls. The float $m$ with the rod $d$ is sufficiently weighted, so that when the rod and float fall, as described, the long arm of the lever $f$ is drawn down also. As a consequence the short arm $k$ is pressed against the button or valve $n$, opening the same and allowing the water $p$ to flow through the tube $j$ to the upright tube C, and thence to the water-apartment in the cooker. It will be seen that by this means the water in the cooker is kept at a practically even level and quantity, as on the slightest fall of the float and rod the supply-valve is opened. By attaching the reservoir to the side of the cooker, which is of course when in use heated to the point of steam evaporation, the water in the reservoir receives heat both from the cooker and from the surface of the range or apparatus which furnishes heat to the cooker, so that there is a constant temperature and steam evaporation in the cooker.

It will be observed that the upper end of the rod $d$ is always in sight, and as it rises and falls the fact is noticeable, and in an ordinary steam-cooker this forms the gage or indicator of the apparatus.

With my improvement this is still of use as an indicator as to whether the apparatus is working as it should.

It is understood that I do not confine myself to the precise details of construction shown, as they may be varied without departing from the spirit of my invention.

Having described my invention, what I claim, and desire to secure by Letters Patent, is—

1. A steam-cooking apparatus of the class described, having a main water-reservoir in its lower portion, combined with an external auxiliary reservoir, a passage connecting the auxiliary and main self-closing reservoirs, a self-closing valve adapted to control the flow of water from the auxiliary reservoir, a float supported by the water in the main reservoir, and a connection between said float and valve whereby the valve is opened when the water in the main reservoir falls below a given point, as set forth.

2. The combination, with a steam-cooker having a main reservoir, $A'$, of an auxiliary reservoir secured to and bearing against the surface of the cooker, whereby the water in said auxiliary reservoir is heated, a connection between said auxiliary and main reservoirs, and means, substantially as described, whereby water from the auxiliary reservoir is automatically admitted to or shut off from the main reservoir, as set forth.

3. The combination of the main reservoir $A'$, having the tube C and float $m$, the auxiliary reservoir B, connected by a tube or passage with the main reservoir, the self-closing valve $n$, for said tube or passage, the pivoted lever $f$, bearing against said valve, and the rod $d$, affixed to the float, and adapted to move said lever and open the valve when the float falls to a given point, as set forth.

4. The combination of the main reservoir $A'$, the auxiliary reservoir B, detachably secured to the external surface of the main reservoir, and connected by a detachable tube, $j$, with the interior of the main reservoir, a self-closing valve adapted to control the escape of water from the auxiliary reservoir, and means, substantially as described, whereby said valve is opened and closed by variations in the height of the water in the main reservoir, as set forth.

In testimony whereof I have signed my name to this specification, in the presence of two subscribing witnesses, this 8th day of February, 1884.

HIRAM A. EATON.

Witnesses:
GEO. W. PIERCE,
FRED J. F. SCHWARTZ.